United States Patent [19]

Hasada

[11] Patent Number: 5,632,581

[45] Date of Patent: May 27, 1997

[54] CLIP

[75] Inventor: Hiroshi Hasada, Chiba, Japan

[73] Assignee: Illinois Tool Works Inc., Glenview, Ill.

[21] Appl. No.: 486,674

[22] Filed: Jun. 7, 1995

[30] Foreign Application Priority Data

Jun. 20, 1994 [JP] Japan .................... 6-160588

[51] Int. Cl.⁶ .................................... F16B 13/06
[52] U.S. Cl. .................... 411/48; 411/53; 411/57
[58] Field of Search .................... 411/44, 45, 48–51, 411/53, 57, 60, 62, 41

[56] References Cited

U.S. PATENT DOCUMENTS

| | | | |
|---|---|---|---|
| 3,918,130 | 11/1975 | Poe | 411/41 |
| 4,242,939 | 1/1981 | Osborne | 411/60 |
| 4,312,614 | 1/1982 | Palmer | 411/44 |
| 4,610,587 | 9/1986 | Wollar | 411/45 |
| 4,668,145 | 5/1987 | Hirohata | 411/45 |
| 4,786,225 | 11/1988 | Poe | 411/60 |
| 5,011,337 | 4/1991 | Clark | 411/51 |
| 5,211,519 | 5/1993 | Saito | 411/48 |
| 5,286,152 | 2/1994 | Anderson | 411/41 |
| 5,370,484 | 12/1994 | Morikawa | 411/48 |

FOREIGN PATENT DOCUMENTS 55-120818   8/1980   Japan .

*Primary Examiner*—Steven N. Meyers
*Assistant Examiner*—Gary Estremsky
*Attorney, Agent, or Firm*—Schwartz & Weinrieb

[57] ABSTRACT

A clip includes a clip body having a flange formed with an insertion hole for receiving a pin; and a substantially cylindrical leg which projects from the bottom surface of the flange, has a hollow interior communicating with the pin insertion hole, and is divided by a plurality of slits formed in the axial direction of the wall thereof into a plurality of segments each formed on the inner side of the tip thereof with a catch projection. The pin has a head and a shaft projecting from the bottom surface of the head, and is formed with a catch for engaging with the catch projections. Each split of the clip body leg is formed wide at the end near the flange and narrow near the tip and the surface of the pin is provided with a plurality of ribs extending in the axial direction of the leg for insertion into at least the wide portions of the slits of the leg.

24 Claims, 6 Drawing Sheets

CLIP

BACKGROUND OF THE INVENTION

1. Field of the Invention

This invention relates to a clip suitable for use in connecting two plates or the like together, and more particularly to a clip which includes a clip body comprising a leg projecting from the bottom surface of a flange and a pin whose shaft portion projects from the bottom surface of a head, and which can be used to fasten two plates together by forming a through hole in each one of the two plates, overlaying the plates with the two through holes aligned with respect to each other inserting the leg of the clip body into the through holes, and forcing the shaft of the pin into the leg so as to expand the tip of the leg of the clip body and thereby lockingly secure the clip within the two plates which in turn secures the two plates together.

2. Description of the Prior Art

In mounting a bumper on an automobile body, it is a common practice to fix the bumper fasciae to retainers on the body panels using synthetic resin clips.

One type of clip used for this purpose consists of a clip body comprising as a substantially cylindrical leg projecting from the bottom surface of a flange, and a pin whose shaft portion projects from the bottom surface of a head. This clip is used to fasten two plates together by forming a through hole in each one of the two plates to be fixed together, overlaying one plate on the other with the two through holes aligned, with respect to each other inserting the leg of the clip body into the through holes, and forcing the shaft of the pin into the leg so as to expand the tip of the leg of the clip body and thus clamp the two plates between the bottom surface of the flange of the clip body and the expanded tip of the leg.

Figure 12:
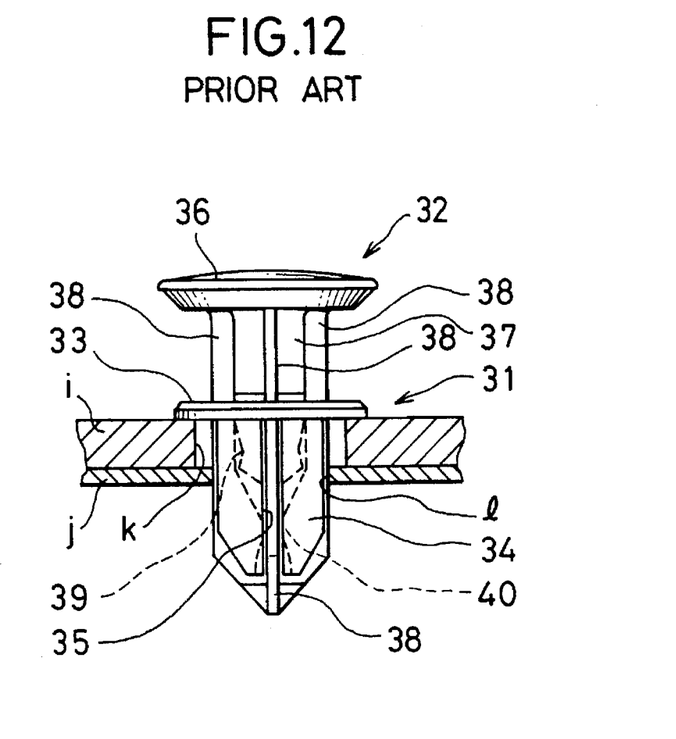
FIG. 12 is an explanatory view showing the leg of a prior art clip inserted into through holes of two plates.
Figure 13:
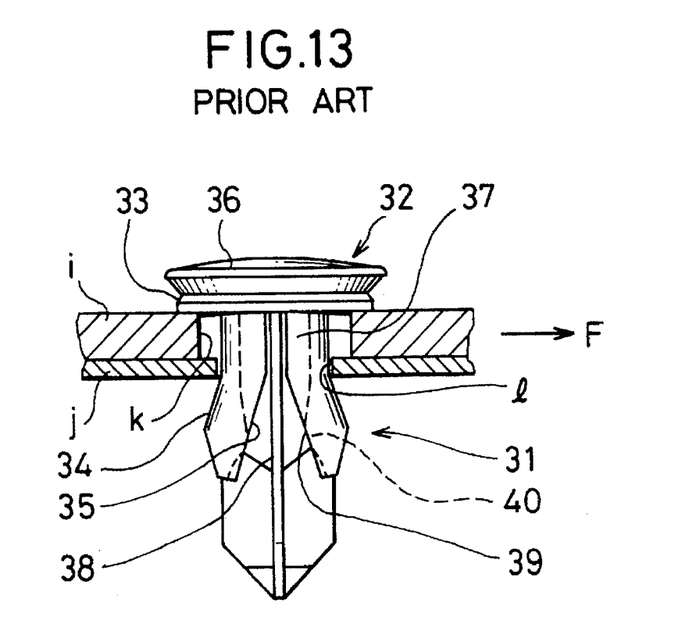
FIG. 13 is an explanatory view showing two plates fastened together by the clip of FIG. 12.

A clip of this type is disclosed in Japanese Utility Model Public Disclosure Sho 55-120818 and is illustrated in FIGS. 12 and 13 of the drawings of the present patent application. As shown in these FIGURES, the clip has clip body 31 as comprising of a flange 33 with a central pin insertion hole and a substantially cylindrical leg 34 which is provided on the bottom surface of the flange 33 with its hollow interior in communication with the insertion hole and which is divided into four segments by four regularly spaced slits 35 formed in the wall of the leg 34 in parallel with the leg axis, and furthermore has a pin 32 comprising a shaft 37 extending from the bottom surface of a head 36 and four ribs 38 formed axially on the periphery of the shaft 37 in correspondence with the slits 35 of the clip body 31.

When the clip is used to fasten together two plates i and j formed with through holes k and l, the plates are overlaid with the through holes aligned with respect to each other and the leg 34 of the clip body 31 is inserted into the through holes as seen in FIG. 12. The shaft 37 of the pin 32 is then forced into the interior of the clip body 31. As shown in FIG. 13, the tip of the leg 34 has a small inner diameter and is pushed outward by the invasion of the shaft 37 so that the segments of the leg 34 flex outward, causing the mid-portion of the leg 34 to expand into pressure contact with the wall of the through hole l thereby clamping the plates i, j together between the expanded portion of the leg 34 and the flange 33. When the shaft 37 has been pushed all the way in, catch projections 40 formed on the inner walls of the segments of the leg 34 engage with a catch dent 39 formed on the shaft 37 of the pin 32, whereby the expanded state of the leg 34 is maintained, and the ribs 38 formed on the shaft 37 of the pin 32 come to rest in the slits 35 of the clip body 31.

However, this clip has insufficient strength against shearing forces. When a strong force acts on the plate i in the direction of the arrow F in FIG. 13, for example, the plates are liable to become unfastened owing to breakage of the clip. When clips of this type are used for mounting a heavy bumper on an automobile body, therefore, there is the danger of the bumper falling off owing to breakage of the clips. It is therefore desirable to increase the strength of such clips without incurring increased costs or other disadvantages.

OBJECT OF THE INVENTION

The present invention was accomplished in light of these circumstances and has as its object to provide a clip with high strength against shearing forces that is easy to use and no more expensive to manufacture than prior art clips of the same type.

SUMMARY OF THE INVENTION

The invention achieves this object by providing a clip comprising a clip body and a pin, the clip body having a flange formed with an insertion hole for receiving the pin, and a substantially cylindrical leg projecting from the bottom surface of the flange, which leg has a hollow interior communicating with the pin insertion hole and is divided, by a plurality of slits formed in the axial direction along the wall thereof, into a plurality of segments each formed on the inner side of the tip thereof with a catch projection, each slit of the leg being formed wide at the end of the leg disposed near the flange and narrow near the tip; and the pin having a head and a shaft projecting from the bottom surface of the head and adapted for insertion into the hollow interior of the leg, the shaft being formed with a catch for engaging the catch projections of the leg and for expanding the leg, and the surface thereof being provided with a plurality of ribs extending in the axial direction of the leg for insertion into at least the wide portions of the slits of the leg.

In accordance with a preferred embodiment of the invention, a plurality of retaining recesses having tapered upper portions are formed on the tip portion of the pin shaft adjacent to the catch.

The clip according to the present invention is suitable, for example, for fastening a plurality of plates together. Plates formed with through holes for receiving clip fasteners are stacked with their through holes in with respect to each other, the leg of the clip body is inserted into the through holes, and the shaft of the pin is forced into the interior of the leg. As a result, the tip of the leg expands and the plates are fastened between the flange of the clip body and the expanded tip of the leg.

More specifically, the leg of the clip body is inserted into the through holes of the stacked plates until the tip thereof projects from the opposite side of the stacked plates and the bottom surface of the flange of the clip body comes into abutment with the uppermost plate. Then when the shaft of the pin is forced into the interior of the leg of the clip body through the pin insertion hole in the flange, the force of the pin shaft on the leg segments flexes the tips of the segments outward, causing the tip of the leg to expand, while, at the same time, the catch projections on the inner surfaces of the leg segments and the catch formed on the shaft engage each other so as to maintain the tip of the leg in the expanded state. As a result, the expanded tip of the leg is pressed against the inner walls of the plate through holes so as to fix the clip therein and the plates are clamped between the bottom surface of the flange of the clip body and the expanded tip of the leg. In addition, the ribs formed on the surface of the pin shaft come to rest in the slits of the clip body leg.

In this type of clip in which the tip of a clip body leg is expanded by forcing a pin shaft into the interior of the leg, the flexing performance of the segments of the clip body leg has to be good so as to insure the smooth expansion of the leg tip. The permissible rigidity of the leg is therefore limited. In the invention clip, however, the width of the slits dividing the leg into the plurality of segments is made wide at the end of the leg near the flange, and the pin shaft ribs, widen than conventional and therefore which can be of high rigidity, come to rest in these wide slit portions. This makes it possible to increase the rigidity of the clip at the base portion of the leg and thus to greatly increase the strength of the clip against shearing forces.

Moreover, since the large width of the slits at the end of the leg near the flange makes the width of the individual leg segments narrow in this region, the flexibility of the leg segments is increased, making it easier to expand the tip of the leg by insertion of the pin shaft. Since the amount of force required for inserting the pin when the clip is employed for fastening is therefore reduced, the clip becomes easier to use. In addition, since the narrow width of the slits near the tip of the leg makes the width of the individual leg segments large in this region, it is possible to form the catch projections to a width sufficient for maintaining the expanded state of the leg tip and for the expanded state of the leg tip to be securely maintained as a result of reliable engagement of the catch projections of the leg with the catch on the pin shaft.

Thus, without raising production costs or causing any other disadvantage and without changing the ease with which the clip can be used, the invention makes it possible to increase the strength of the clip against shearing forces and to easily enhance the strength of the clip simply by adjusting the width of the slits in the leg of the clip body and forming the ribs on the shaft of the pin to match the size of the slits.

BRIEF DESCRIPTION OF THE DRAWINGS

The above and other features of the present invention will become apparent from the following description made with reference to the accompanying drawings in which like reference characters designate like or corresponding parts throughout the several views, and wherein.

DESCRIPTION OF THE PREFERRED EMBODIMENT

Figure 1:
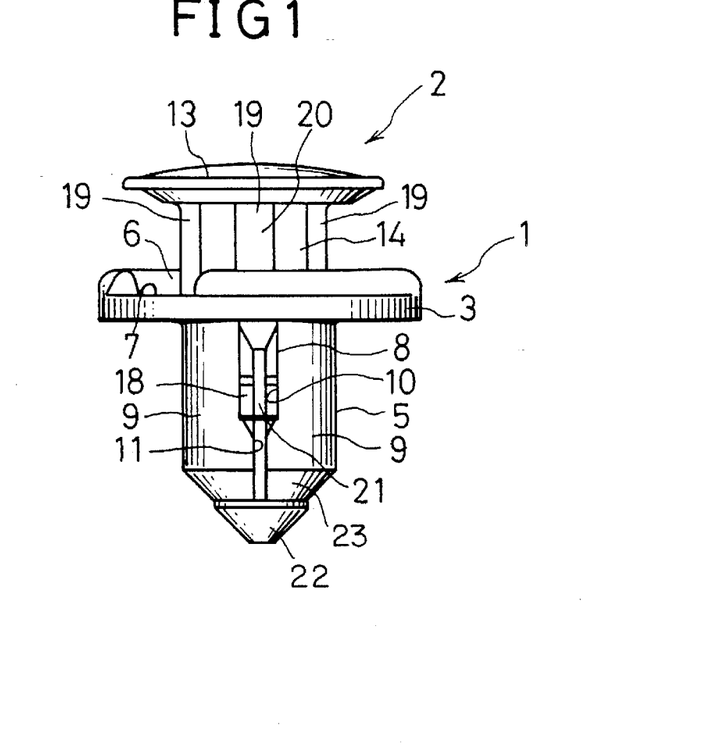
FIG. 1 is a front view of a clip that is an embodiment of the invention.
Figure 2:
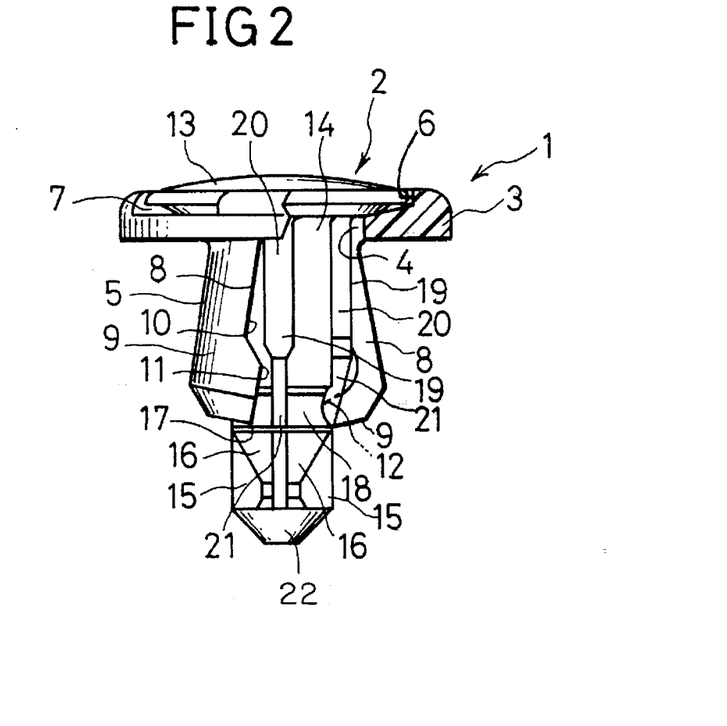
FIG. 2 is a front view, partially broken away, showing the clip of FIG. 1 with the shaft of the pin thereof forced into the leg of the clip body thereof.
Figure 3:
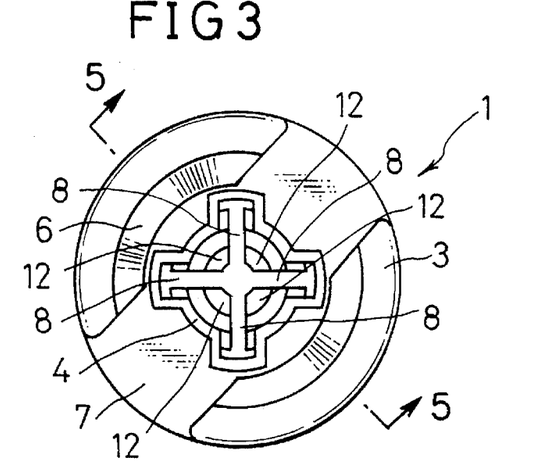
FIG. 3 is a plan view of the clip body of the clip of FIG. 1.
Figure 4:
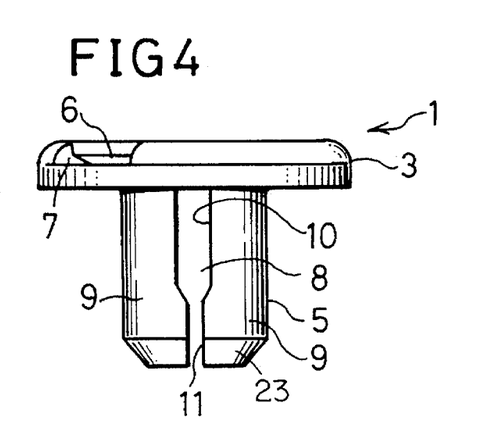
FIG. 4 is a front view of the clip body of FIG. 3.
Figure 5:
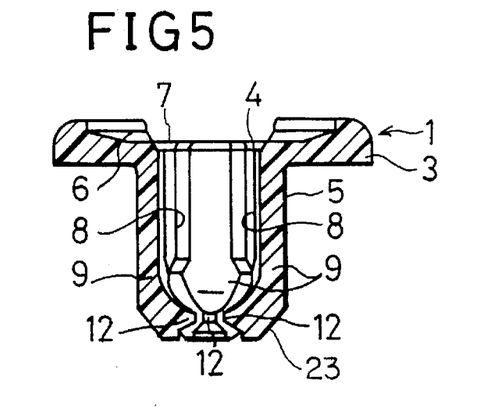
FIG. 5 is a sectional view taken along line 5—5 of FIG. 3.
Figure 6:
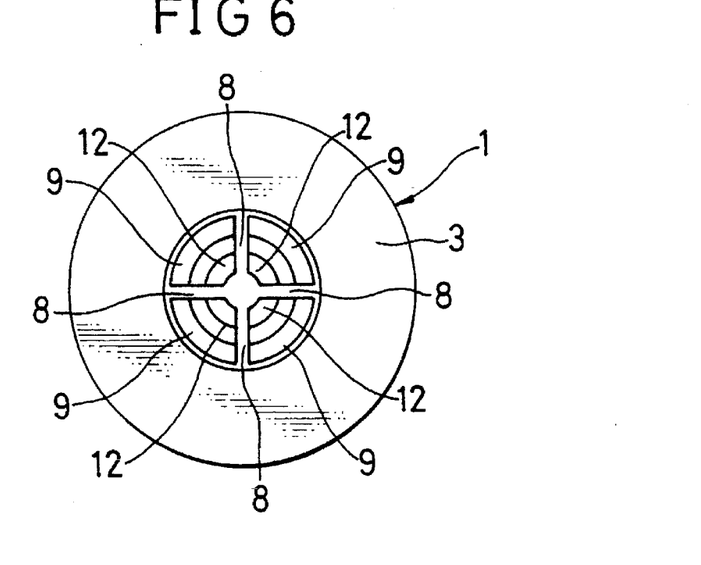
FIG. 6 is a bottom view of the clip body of FIG. 3.

FIGS. 1–11 show a clip that is an embodiment of the invention. As shown in FIGS. 1 and 2, the clip comprises of a clip body 1 and a pin 2.

As shown in FIGS. 3–6, the clip body i has a disk-like flange 3 with a central pin insertion hole 4, and a hollow, substantially cylindrical leg 5 projecting from the center of the bottom surface of the flange 3 with its hollow interior in communication with the pin insertion hole 4.

The central portion of the top surface of the flange 3 is countersunk so as to form a circular pin head seat 6 and is further provided with a relatively wide tool insertion slot 7 extending across the flange.

The peripheral wall of the leg 5 is formed with four regularly spaced slits 8 running parallel to the leg's longitudinal axis. The slits 8 divide the leg 5 into four segments 9. Each slit 8 comprises an upper wide portion 10 and a lower narrow portion 11. The wide portions 10 pass through the flange 3 and open at the top surface thereof.

The segments 9 formed by the slits 8 are formed on the inner surfaces of their tips with catch projections 12 which reduce the inner diameter at the tip of the leg 5. The tip of the leg 5 is chamfered as at 23 so as to reduce its outer diameter.

Figure 8:
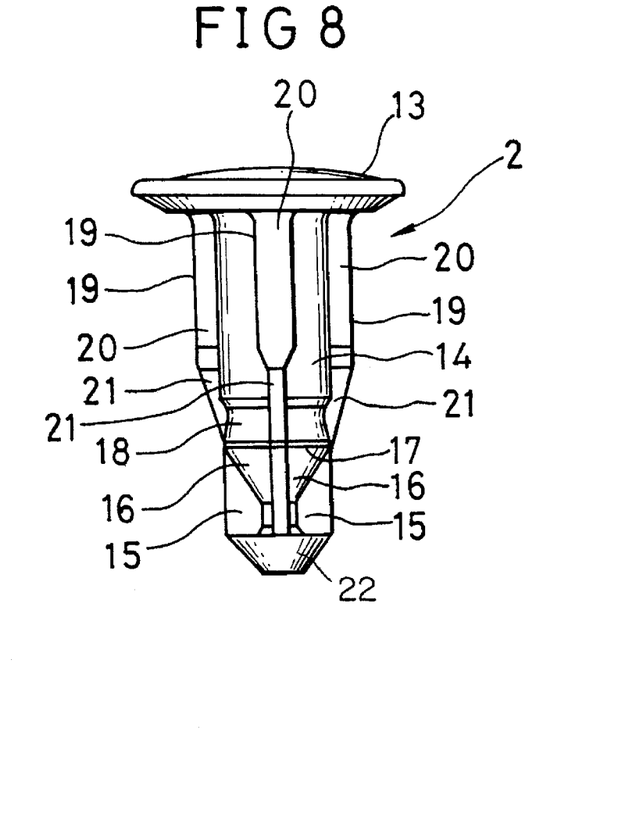
FIG. 8 is a front view of the pin of the clip of FIG. 1.
Figure 9:
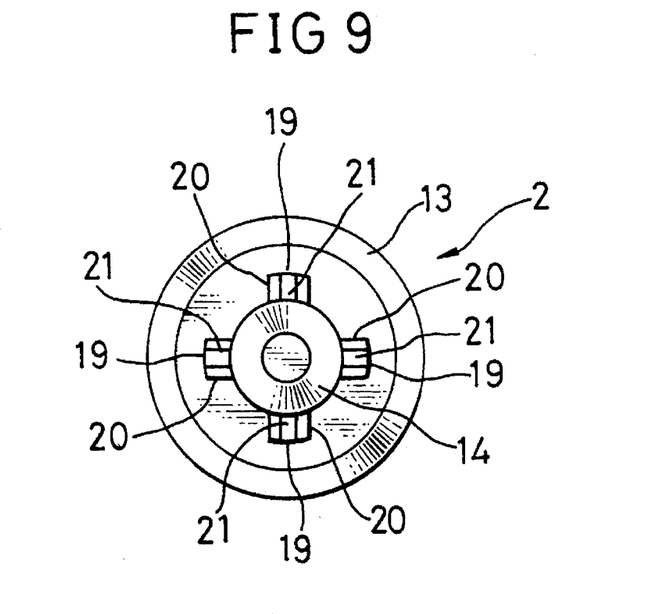
FIG. 9 is a bottom view of the pin of FIG. 8.

As shown in FIGS. 8 and 9, the pin 2 has a disk-like head 13 and a solid, substantially cylindrical shaft 14 projecting from the center of the bottom surface of the head 13. The periphery of the shaft 14 tip is formed with four regularly spaced retaining recesses 15, only two of which are visible in the drawings). The upper portion of each retaining recess 15 is defined by a tapered surface 16 which gradually reduces the depth of the retaining recess 15 toward the top. An annular catch dent 18 is formed above the retaining recesses 15 and is partitioned therefrom by a catch step 17. The periphery of the shaft 14 is further provided with four ribs 19 running parallel to the shaft axis from under the head 13 to the catch step 17. The ribs have upper wide portions 20 and lower narrow portions 21 configured to match the slits 8 formed in the leg 5 of the clip body 1. The narrow portion 21 of each rib gradually decreases in radial extent toward the bottom, finally meeting with the surface of shaft 14 at the catch step 17. The tip of the shaft 14 is chamfered as at 22 so as to reduce its outer diameter.

The clip according to this embodiment is obtained by coupling the clip body 1 and the pin 2. As will be understood from FIG. 1, the clip body 1 and the pin 2 can be provisionally coupled by inserting the shaft 14 of the pin 2 into the pin insertion hole 4 from the upper side of the flange 3 of the clip body 1 and pressing it inward until the catch projections 12 protruding inward from the tips of the segments 9 of the leg 5 of the clip body 1 engage the four retaining recesses 15 formed on the tip of the shaft 14 of the pin 2. In this provisionally coupled state, the head 13 of the pin 2 and the proximal portion of the shaft 14 of the pin 2 project above the top surface of the flange 3 of the clip body 1 as seen in FIG. 1.

Next, as will be understood from FIG. 2, if the head 13 of the pin 2 of the provisionally assembled clip is pressed downwardly so as to drive the shaft 14 of the pin 2 deeper into the leg 5 of the clip body 1, the catch projections 12 protruding inwardly from the tips of the segments 9 of the leg 5 are pushed outwardly by means of the tapered surfaces 16 of the retaining recesses 15 formed on the tip of the shaft 14 of the pin 2, causing the segments 9 to flex outwardly and expand the tip of the leg 5, whereafter the catch projections 12 ride over the catch step 17 provided above the retaining recesses 15 and engage the catch dent 18. As a result, the catch projections 12 of the leg segments 9 are retained in the catch dent 18 by the catch step 17 so that the tip of the leg 5 is maintained in its expanded state. At this time, moreover, the ribs 19 of the pin 2 are located in the slits 8 of the leg 5 of the clip body 1, with the wide portions 20 of the ribs 19 disposed within the wide portions 10 of the slits 8 and the narrow portions 21 of the ribs 19 disposed within the narrow portions 11 of the slits 8. In 35 addition, the head 13 of the pin 2 is disposed within the pin head seat 6 formed in the top surface of the flange 3 of the clip body 1 and thus does not substantially above the flange 3.

The method of using the clip and its operation will now be explained.

Figure 10:
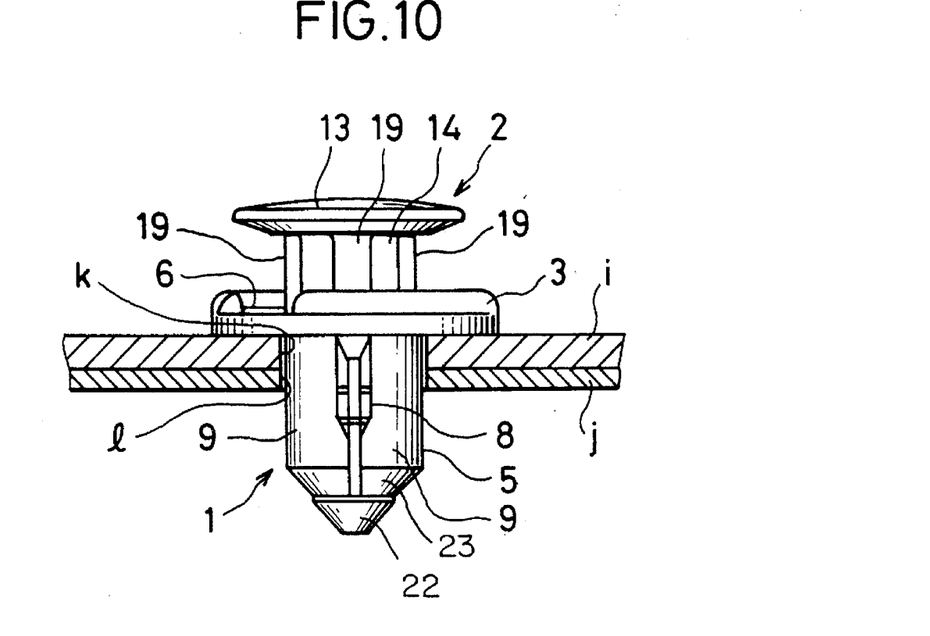
FIG. 10 is an explanatory view showing the leg of the clip of FIG. 1 inserted into through holes of two plates to be fastened together by the clip.

When the clip is used for fastening two plates i, j together, as shown in FIG. 10, the plates are overlaid and positioned so as to bring through holes k, l drilled therein beforehand into alignment with respect to each other, the clip is provisionally assembled by inserting the shaft 14 of the pin 2 into the leg 5 of the clip body 1, and the provisionally assembled clip is inserted through the through holes k, l until the bottom surface of the flange 3 of the clip body 1 is flush with the upper surface of the upper plate.

Figure 11:
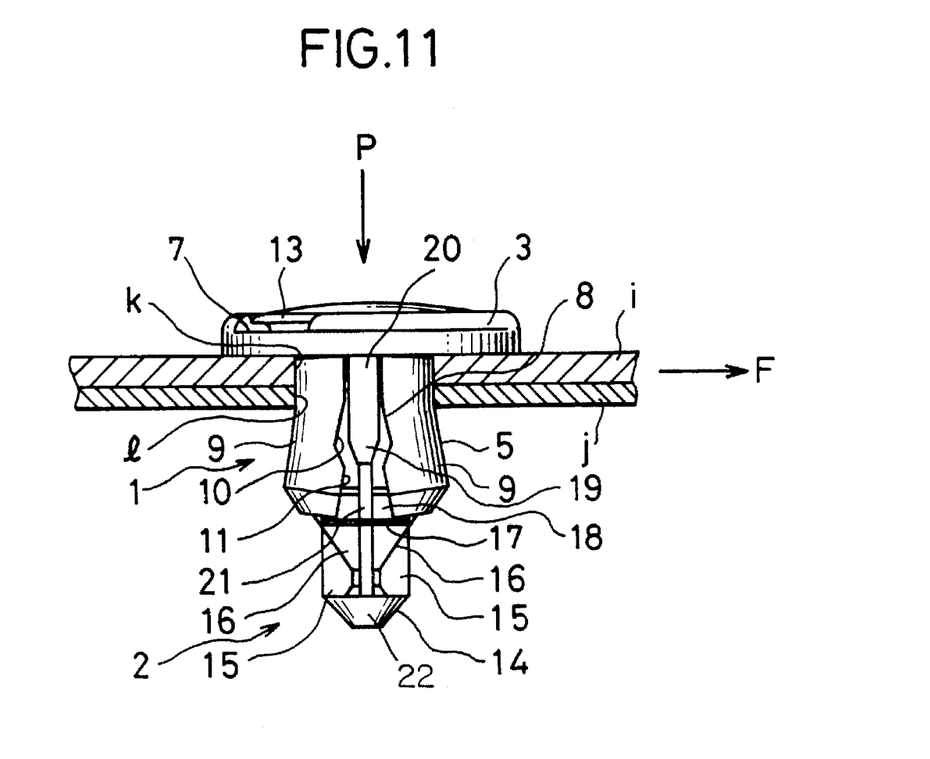
FIG. 11 is an explanatory view showing two plates fastened together by the clip of FIG. 1.

Next, as can be seen in FIG. 11, force is applied to the head 13 of the pin 2 in the direction of the arrow P so as to drive the shaft 14 of the pin 2 deeper into the leg 5. The tip of the leg 5 is therefore expanded by the aforenoted action of the tapered surfaces 16 of the retaining recesses 15 of the pin 2 acting upon the projections 12 of the leg segments 9, and the catch projections 12 of the segments 9 of the leg 5 engage the catch dent 18 of the shaft 14 of the pin 2. The tip of the leg 5 is maintained in this expanded state since the catch projections 12 are retained in the catch dent 18 by the catch step 17.

The expanded segment 9 of the leg 5 are forced into contact with the inner walls of the through holes k, l of the plates i, j to fix the clip therein and the plates i, j so as are clamped between the bottom surface of the flange 3 of the clip body 1 and the expanded segments 9 of the leg 5. In addition, the ribs 19 formed on the surface of the shaft 14 of the pin 2 are fully seated within the slits 8 of the leg 5 of the clip body 1.

In this embodiment of the clip, the width of the slits 8 dividing the leg 5 into the segments 9 are made wide at the end near the flange 3, and the ribs 20 on the shaft 14 of the pin 2, which are similarly wide and therefore have a high degree of rigidity, are disposed within these wide slit portions. This makes it possible to increase the rigidity of the clip at the base portion of the leg 5 and thus to greatly increase the strength of the clip against shearing forces. The plates i, j can therefore be maintained securely fastened even if, as shown by way of example in FIG. 11, a strong shearing force should act on one of them, such as, for example, plate i in the direction of the arrow F. Moreover, since the large width of the slits 8 at the end of the leg 5 near the flange 3 makes the width of the individual leg segments 9 narrow in this region, the flexibility of the segments 9 is increased, making it easier to expand the tip of the leg 5 by insertion of the shaft 14 of the pin 2. Since the amount of force required for inserting the pin 2 during a fastening operation using the clip is therefore reduced, the clip becomes easier to use.

Thus without making the clip any more complex to operate and without increasing production costs or causing any other disadvantage, this embodiment of the invention provides increased strength against shearing forces and also enables the strength of the clip to be easily enhanced simply by adjusting the width of the slits 8 in the leg 5 of the clip body 1 and forming the ribs 19 on the shaft 14 of the pin 2 to match the size of the slits.

Figure 7:
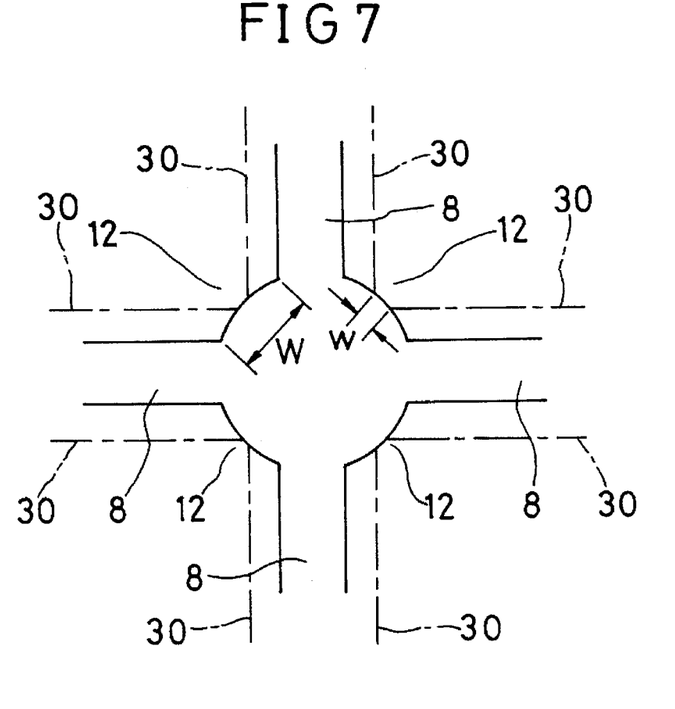
FIG. 7 is a partial enlarged view showing the catch projections formed on the leg of the clip body of FIG. 3.

In addition, since the narrow width of the slits 8 near the tip of the leg 5 makes the width of the individual leg segments 9 large in this region, it is possible to form the catch projections 12 to have a width which is sufficient for maintaining the expanded state of the leg tip and for the expanded state of the tip of the leg 5 to be securely maintained by reliable engagement between the catch projections 12 and the catch step 17 and the catch dent 18 of the shaft 14 of the pin 2. More specifically, as shown in FIG. 7, since in this embodiment of the clip the slits 8 formed in the leg 5 are made narrow near the tip or bottom of the leg 5, the tips of the catch projections 12 can be given a considerably large width W. Although the increased strength the shearing forces provided by this embodiment of the clip can be attained even if the slits 8 are made wide throughout the axial extent of the leg 5, this would give the tips of the catch projections 12 a very small width w, as indicated by the chain lines 30 in FIG. 7. The engagement force between the catch projections 12 and the catch step 17 and the catch dent 18 would therefore become insufficient due to the small engagement width therebetween, increasing the likelihood of undesired loss of the expanded state of the leg 5 and possibly leading to progressive weakening of the engagement force due to wear caused by slippage between the catch projections 12 and the shaft 14.

Moreover, since the clip of this embodiment is configured so that the head 13 of the pin 2 is disposed in the pin head seat 6, there is almost no possibility of the expanded state of the leg 5 being lost because of something inadvertently engaging the head 13 of the pin 2 and pulling the pin 2 upwardly. On the other hand, if it is desired to release the expanded state of the leg 5 by deliberately pulling the pin 2 upwardly, this can be easily accomplished by inserting the tip of an ordinary screwdriver through the tool insertion slot of the flange 3 and between the head 13 of the pin 2 and the upper surface of the pin head seat 6 and then prying the head 13 of the pin 2 upwardly. Once the pin 2 has been lifted to the point where the catch projections 12 provided on the segments 9 of the leg 5 have ridden over the catch step 17 of the shaft 14, the elastic forces of the segments 9 of the leg 5 acting in conjunction with the tapered surfaces 16 of the retaining recesses 15 below the catch step 17 automatically raise the pin 2, so that the expanded state of the leg 5 can be released with utmost ease by prying the pin 2 upwardly only slightly.

The clip according to the invention is not limited to the embodiment described in the foregoing. For example, in accordance with an embodiment which is different from the foregoing embodiment which is formed with the tool insertion slot 7 diametrically traversing the flange 3 in the form of a band so as to form two entrances for insertion of a tool at the periphery of the flange 3, it is possible instead to form only a single tool insertion entrance by cutting away only one part of the periphery of the pin head seat so as to open the outer edge of the flange 3 or to form three or more tool insertion entrances by cutting away the periphery of the pin head seat 6 at three or more places. It is also possible to omit the pin head seat 6 and the tool insertion slot 7. Further, while the clip of the embodiment is designed so that prior to use the clip body 1 and the pin 2 are provisionally coupled by engagement of the catch projections 12 formed on the leg 5 of the clip body 1 with the retaining recesses 15 formed on the shaft 14 of the pin 2, it is alternatively possible to store the clip body and the pin separately and to join the clip body and pin and expand the leg of the clip body by inserting the pin into the clip body at the time of use. In addition, it is possible to omit the narrow portions 21 of the ribs 19 and to provide the shaft 14 of the pin 2 only with ribs for insertion into the wide portions 10 of the slits 8.

As explained in the foregoing, the invention responds to the long-felt need for a clip with greater strength against shearing forces without creating other problems such as increased production costs and, in addition, enhances the operability of the clip by making it easy to insert the pin and expand the leg with only a small force. Obviously, many modification and variations of the present invention are possible in light of the above teachings. It is therefore to be understood that within the scope of the appended claims, the present invention may be practiced otherwise than as specifically described herein.

What is claimed is:

1. A clip, comprising:

a clip body having a longitudinal axis; and a pin, having a longitudinal axis substantially coaxial with said longitudinal axis of said clip body, for insertion into said clip body;

said clip body having a flange formed with an insertion hole for receiving said pin; and a substantially cylindrical leg, disposed about said longitudinal axis of said clip body, projecting from a bottom surface portion of said flange, wherein said leg has a hollow interior communicating with said pin insertion hole defined within said flange and is divided, by means of a plurality of axially extending slits formed within peripheral wall portions thereof, into a plurality of segments wherein each segment is formed on the inner side of a tip portion thereof, remote from said flange, with a catch projection, and wherein each one of said plurality of slits is formed relatively wide at the end disposed near said flange and relatively narrow at the end disposed near said tip portion; and said pin has a head, and a shaft projecting from a bottom surface portion of said head and adapted for insertion into said hollow interior of said leg of said clip body; said shaft being formed with a catch for engaging said catch projections of said leg segments of said clip body and thereby expanding said leg segments of said clip body radially outwardly, and a plurality of axially extending ribs having wide portions extending from said bottom surface portion of said head of said pin toward said catch of said pin, said ribs having width dimensions substantially similar to the width dimensions of said relatively wide portions of said slits of said leg of said clip body for insertion into said relatively wide portions of said slits of said leg of said clip body so as to provide said clip with increased resistance to shearing forces.

2. A clip according to claim 1, wherein:

retaining recesses, having tapered upper portions, are formed upon a tip portion of said pin shaft adjacent to said catch for retaining said catch projections of said leg segments therein and thereby maintaining said pin at a first axial position with respect to said clip body, said tapered upper portions of said retaining recesses guidingly moving said catch projections and said leg segments between said retaining recesses disposed at said first axial position and said catch of said pin shaft within which said catch projections of said leg segments are disposed when said pin is diposed at a second axial position with respect to said clip body.

3. A clip according to claim 1, wherein:

said axially extending ribs also have narrow portions for insertion into said narrow portions of said slits.

4. The clip as set forth in claim 1, wherein:

said relatively wide slit portions of said leg segments define relatively narrow portions of said leg segments adjacent to said flange of said clip body so as to provide said leg segments with a desired degree of flexibility.

5. The clip as set forth in claim 1, wherein:

a distal end portion of said pin is chamfered so as to facilitate insertion of said pin into said insertion hole of said clip body.

6. The clip as set forth in claim 2, further comprising:

countersunk means defined within said flange of said clip body for seating said head of said pin when said pin is disposed at said second axial position with respect to said clip body.

7. The clip as set forth in claim 6, further comprising:

slot means defined within said flange of said clip body and in communication with said countersunk means for permitting a tool to be inserted into said flange of said clip body and beneath said head of said pin so as to move said pin from said second axial position with respect to said clip body toward said first axial position with respect to said clip body.

8. The clip as set forth in claim 7, wherein:

said slot means extends diametrically across said flange of said clip body and intersects said countersunk means within which said head of said pin is seated.

9. The clip as set forth in claim 2, wherein:

said catch of said pin shaft comprises a catch dent, and a catch step separating said catch dent of said catch from said tapered upper portions of said retaining recesses.

10. The clip as set forth in claim 2, wherein:

said leg of said clip body comprises four axially extending slits dividing said leg into four circumferentially spaced leg segments.

11. The clip as set forth in claim 10, wherein:

said pin shaft comprises four retaining recesses for respectively accommodating one of said catch projections of said leg segments.

12. In combination, a clip for securing two plates together, comprising:

a first plate having a first hole defined therethrough;

a second plate having a second hole defined therethrough;

a clip body having a longitudinal axis, a flange for engaging one surface of said first plate and formed with an axially extending through-hole, and a substantially cylindrical leg portion, disposed about said longitudinal axis of said clip body, projecting from a bottom surface portion of said flange, wherein said leg portion has a hollow through-bore in communication with said through-hole of said flange and is divided, by means of a plurality of axially extending slits formed within peripheral wall portions thereof, into a plurality of segments wherein each segment is formed, upon a radially inner side of a tip portion thereof remote from said flange, with a catch projection, and wherein each one of said plurality of slits is formed relatively wide at the end disposed adjacent to said flange and relatively narrow at the end disposed adjacent to said tip portion; and a pin having a longitudinal axis substantially coaxial with said longitudinal axis of said clip body, a head, and a shaft projecting from a bottom surface portion of said head for insertion through said through-hole of said flange of said clip body and into said through-bore of said leg portion of said clip body; said shaft being formed with a catch for engaging said catch projections of said leg segments of said clip body and thereby expanding said leg segments of said clip body radially outwardly into engagement with said second plate whereby said first and second plates are secured together between said flange of said clip body and said expanded leg segments of said clip body, and a plurality of axially extending ribs having wide portions extending from said bottom surface portion of said head of said pin toward said catch of said pin, said ribs having width dimensions substantially similar to the width dimensions of said relatively wide portions of said slits of said leg portion of said clip body for insertion into said relatively wide portions of said slits of said leg portion of said clip body so as to provide said clip with increased resistance to shearing forces.

13. The combination as set forth in claim 12, wherein:

retaining recesses, having tapered upper portions, formed upon a tip portion of said pin shaft adjacent to said catch for retaining said catch projections of said leg segments therein and thereby maintaining said pin at a first axial position with respect to said clip body, said tapered upper portions of said retaining recesses guidingly moving said catch projections of said leg segments between said retaining recesses, disposed at said first axial position, and said catch of said pin shaft within which said catch projections of said leg segments are disposed when said pin is disposed at a second axial position with respect to said clip body.

14. The combination as set forth in claim 12, wherein:

a distal end portion of said leg portion of said clip body is chamfered so as to facilitate insertion of said clip body through said first and second holes of said first and second plates.

15. The combination as set forth in claim 12, wherein:

said axially extending ribs also have relatively narrow portions for insertion into said relatively narrow portions of said slits.

16. The combination as set forth in claim 12, wherein:

said relatively wide slit portions of said leg segments define relatively narrow portions of said leg segments adjacent to said flange of said clip body so as to provide said leg segments with a desired degree of flexibility.

17. The combination as set forth in claim 12, wherein:

a distal end portion of said pin is chamfered so as to facilitate insertion of said pin into said through-hole and said through-bore of said clip body.

18. The combination as set forth in claim 13, further comprising:

countersunk means defined within said flange of said clip body for seating said head of said pin when said pin is disposed at said second axial position with respect to said clip body.

19. The combination as set forth in claim 18, further comprising:

slot means defined within said flange of said clip body and in communication with said countersunk means for permitting a tool to be inserted into said flange of said clip body and beneath said head of said pin so as to move said pin from said second axial position with respect to said clip body and toward said first axial position with respect to said clip body when said clip is desired to be removed from said first and second holes of said first and second plates so as to permit said first and second plates to be separated with respect to each other.

20. The combination as set forth in claim 19, wherein:

said slot means extends diametrically across said flange of said clip body and intersects said countersunk means within which said head of said pin is seated.

21. The combination as set forth in claim 13, wherein:

said catch of said pin shaft comprises a catch dent, and a catch step separating said catch dent of said catch from said tapered upper portions of said retaining recesses.

22. The combination as set forth in claim 13, wherein:

said leg of said clip body comprises four axially extending slits dividing said leg portion into four circumferentially spaced leg segments; and said pin shaft comprises four retaining recesses for respectively accommodating one of said catch projections of said leg segments.

23. The clip as set forth in claim 1, wherein:

said relatively narrow slit portions of said leg segments define relatively wide portions of said leg segments adjacent to said tip portions thereof so as to provide relatively wide catch projections for enhancing retention of said catch projections of said leg segments within said catch of said pin shaft when said catch projections of said leg segments are engaged with said catch of said pin shaft.

24. The combination as set forth in claim 12, wherein:

said relatively narrow slit portions of said leg segments define relatively wide portions of said leg segments adjacent to said tip portions thereof so as to provide relatively wide catch projections for enhancing retention of said catch projections of said leg segments within said catch of said pin shaft when said catch projections of said leg segments are engaged with said catch of said pin shaft.

* * * * *